(12) United States Patent  (10) Patent No.: US 8,411,990 B1
Hadap et al.  (45) Date of Patent: Apr. 2, 2013

(54) SYSTEM AND METHOD FOR DECOMPOSING AN IMAGE INTO REFLECTANCE AND SHADING COMPONENTS

(75) Inventors: Sunil Hadap, San Jose, CA (US); Xiang Huang, Evanston, IL (US)

(73) Assignee: Adobe Systems Incorporated, San Jose, CA (US)

(*) Notice: Subject to any disclaimer, the term of this patent is extended or adjusted under 35 U.S.C. 154(b) by 464 days.

(21) Appl. No.: 12/857,385

(22) Filed: Aug. 16, 2010

Related U.S. Application Data

(60) Provisional application No. 61/238,061, filed on Aug. 28, 2009.

(51) Int. Cl.
  *G06K 9/40* (2006.01)
  *G06K 9/00* (2006.01)
  *G06K 9/62* (2006.01)

(52) U.S. Cl. .................. 382/274; 382/154; 382/225

(58) Field of Classification Search .................. None
See application file for complete search history.

(56) References Cited

U.S. PATENT DOCUMENTS

2007/0273686 A1* 11/2007 Watanabe et al. ............. 345/419

OTHER PUBLICATIONS

H.G. Barrow and J.M. Tenenbaum, "Recovering Intrinsic scene characteristics from images," in Computer Vision Systems, Academic Press, pp. 3-26, 1978.

B. K. P. Horn and B. G. Schunck, "Determining optical flow," Artificial Intell., vol. 17, No. 1, pp. 185-204, 1981.

Edwin H. Land and John J.McCann. Lightness and retinex theory. Journal of the Optical Society of America, 61:1-11, 1971. 49, 108.

B. V. Funt, M. S. Drew, and M. Brockington. Recovering shading from color images. In European Conf. on Computer Vision (ECCV), pp. 124-132, 1992.

M. F. Tappen, W. T. Freeman, and E. H. Adelson. Recovering intrinsic images from a single image. IEEE Trans. Pattern Analysis and Machine Intelligence, 27:1459-1472, 2005.

* cited by examiner

*Primary Examiner* — Amir Alavi
*Assistant Examiner* — Kenny Cese
(74) *Attorney, Agent, or Firm* — Wolfe-SBMC

(57) ABSTRACT

Various embodiments of a system and methods for decomposing an image into reflectance and shading components are described. An image decomposition module may represent an image as a product of the reflectance and shading components of the image. Data representing the image may be transformed into an image gradient containing both reflectance and shading component gradients. A normal vector perpendicular to the direction of the reflectance component gradient may be determined, based on a difference between the color channels of the image gradient. The image gradient may be modified according to the normal vector to eliminate the reflectance component gradient. The shading component gradient may be determined from the modified image gradient. The shading component gradient may be transformed into the shading component. The reflectance component may be determined by substituting the shading component into the representation of the image which is a product of the reflectance and shading components.

20 Claims, 6 Drawing Sheets

SYSTEM AND METHOD FOR DECOMPOSING AN IMAGE INTO REFLECTANCE AND SHADING COMPONENTS

PRIORITY INFORMATION

This application claims benefit of priority of U.S. Provisional Application Ser. No. 61/238,061 entitled "System and Method for Image Decomposition into Reflectance and Shading Images" filed Aug. 28, 2009, the content of which is incorporated by reference herein in its entirety.

BACKGROUND

Three-dimensional (3D) modeling of physical objects has many applications in the area of computer graphics. For example, computer-based 3D models of objects may be employed to generate animation, to insert digital images into film or photographic images, to design objects, and for many other purposes. 3D models of physical objects are often generated using digital images of the physical objects, such as images captured by a digital camera. To generate an accurate 3D model of an object depicted in a digital image, a developer may wish to remove environmental effects that may obscure the characteristics of the modeled object. For example, lighting and shading effects in an image can obscure the shape of objects in the image. To create an accurate three-dimensional (3D) model of an object depicted in an image, a developer may wish to remove the lighting effects from the image.

To remove such environmental effects, digital images are often separated into intrinsic images which contain only isolated, inherent properties of the image. For example, a digital image can be separated into intrinsic images such as reflectance and shading images. A reflectance image extracted from an original image is isolated from the lighting and shading effects of the original image and represents the material properties (such as color and texture) of objects depicted in the image. A reflectance image, with lighting and shading effects removed, may provide an accurate representation of an object's shape. A shading image extracted from an original image is a grayscale representation of the illumination of an image.

Intrinsic images may be used in computer vision and graphics tasks. Segmentation and stereo matching algorithms may be more effective when using an illumination invariant reflectance image (e.g., a reflectance image with no intrinsic shading characteristics). As an example, a texture map for a 3D model of an image may be generated more accurately when lighting effects have been removed from the image. As another example, shape-from-shading algorithms may be more effective using only a shading image (e.g., an image absent of reflectance, or albedo information) to infer object geometry. As a further example, image relighting efforts, such as removing flash lighting effects to soften an image taken with flash photography, may require an image containing only intrinsic properties such as reflectance, normal, and depth. In such a case, the intrinsic properties of an image due to lighting effects may need to be removed before new lighting effects can be added.

Conventional methods assume that reflectance and shading components of an image do not change at the same location on an image. Such conventional methods analyze an image to locate image derivatives (e.g., changes in image characteristics) across the image and then use a binary classifier to classify each image derivative as either a reflectance or a shading derivative. For example, large image derivatives may be classified as reflectance derivatives and small image derivatives may be classified as shading derivatives. However, such a binary classification of image properties does not accurately model real world images. Each point on an image is more likely to have a combination of both reflectance and shading characteristics, rather than be restricted to one characteristic or the other. Furthermore, choosing an appropriate threshold for the binary classifier is difficult and a poorly selected threshold will result in further inaccuracies in a 3D model of an object.

A binary classifier used in conventional methods may be trained to produce accurate classifications of reflectance and shading characteristics across an image, but the training method is time-consuming and difficult to perform. For example, the training method requires matched lighting directions across training images and testing images, which is extremely limiting and difficult to obtain. In addition, a very large amount of training data must be collected, which is time-consuming. Furthermore, since the trained binary classifier requires such a large amount of training data, the computation time required for classifying the reflectance and shading characteristics of an image is long and, as a result, computationally expensive.

SUMMARY

Various embodiments of a system and methods for decomposing an image into reflectance and shading components are described. An image decomposition module may separate an original image into intrinsic images which contain the inherent reflectance and shading components of the original image. The image decomposition module may represent the original image as a product of the reflectance component and the shading component of the image. In some embodiments, the image decomposition module may transform data representing an image into an image gradient. The gradient domain may provide a convenient and intuitive environment for expressing the properties of an image in terms of variances that occur across the image. The image gradient may contain both a reflectance component gradient and a shading component gradient.

The image decomposition module may determine a normal vector that is perpendicular to the direction of the reflectance component gradient. The direction of the normal vector may be based on the difference between the various color channels of the image gradient. For example, the image decomposition module may compute the differences between each pair of the image color channel gradients and set the direction of the normal vector perpendicular to the sum of the differences. The image decomposition module may set the direction of the normal vector perpendicular to the differences between the color channels of the image gradients based on an assumption that the color channel gradients of the reflectance component are parallel. Such an assumption may be based on an observation that the material properties of typical surfaces may be most likely to change in a similar manner for all color channels of the material.

The image decomposition module may modify the image gradient according to the normal vector. For example, the image decomposition module may project the image gradient in the direction of the normal vector, which may eliminate the reflectance component from the modified version of the image gradient. Accordingly, the modified image gradient may contain only a shading component gradient and the shading component gradient may be determined from the modified image gradient. The image decomposition module may determine the shading component of the image by transforming the shading component gradient into an image shading component. The reflectance component of the image may be determined by substituting the known shading component into the representation of the image which is a product of the reflectance and shading components.

Figure 1:
FIG. 1 illustrates an example of a shading image, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (e.g., meaning having the potential to), rather than the mandatory sense (e.g., meaning must). Similarly, the words "include", "including", and "includes" mean including, but not limited to.

DETAILED DESCRIPTION OF EMBODIMENTS

Various embodiments of a system and methods for decomposing an image into reflectance and shading components are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description may be presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

A system and methods for decomposing an image into reflectance and shading components are described herein. Decomposition of an image may include separating the image into a collection of images, with each image of the collection containing an isolated, intrinsic property of the original image. An intrinsic property of an image may be a natural property of the image that inherently exists in the image and is independent of any influence that other, external entities may have on the properties of the image. As described in further detail below, the reflectance of an image may be an intrinsic property of the image. Images that contain intrinsic properties of an original image may be referred to as "intrinsic images." For example, an intrinsic image may contain the reflectance property of an image. Such an intrinsic image may be created by isolating the reflectance property of the image from other properties of the image such that the intrinsic image contains only the reflectance properties inherent to the image. For simplicity, intrinsic images of an original image may be referred to herein as components of the original image. For example, an intrinsic image containing the reflectance properties of an original image may be referred to herein as the reflectance component of the original image.

Some examples of intrinsic properties of an image may be the reflectance and shading properties of the image. Reflectance (also referred to as "albedo") may describe the ratio of reflected light to incident light at each point on an image. The reflectance properties of an image may indicate the color and material properties of the image. More specifically, the reflectance at a particular point on an image may represent the color and material properties of the image at that particular point. For example, the reflectance of a point on a shirt may represent the pigmentation (e.g., color) and texture (e.g., material property) of the shirt at that point. A reflectance image, or reflectance component, of an original image may contain the intrinsic reflectance properties for each point of the original image. A reflectance image may be considered an illumination invariant image, e.g., an image without any intrinsic shading characteristics. In other words, the reflectance component of an image may be isolated from the shading component of the image.

Shading may be described as the interaction between the shape of objects in an image and the illumination of the image. The shading properties of an image may the result of lighting effects that were present when the image was captured. The shading properties of an image may be determined by the shape of objects within the image (for example, surface orientation, occlusion, etc.) and the illumination of the image. Shading properties may be represented as a variation of grayscale color across the surface of the objects in an image. A shading image, or shading component, of an original image may contain the intrinsic shading properties of an original image. Objects in a shading image may be considered to be painted with constant albedo (e.g., constant reflectance) material. In other words, the shading component of an image may be isolated from the reflectance component of the image. An example of a shading image is illustrated in FIG. 1.

Various embodiments of a system and methods for decomposing an image into reflectance and shading components are described herein. Embodiments of an image decomposition method, which may be implemented as or in a tool, module, plug-in, stand-alone application, etc. may be used to decompose an image into reflectance and shading components. The image reflectance and shading components may allow a developer to improve the accuracy of 3D models of objects in the image by isolating color and material properties (e.g., reflectance properties) from lighting and shading effects (e.g., shading properties) in the image. Implementations of embodiments of the image decomposition method described herein will be referred to collectively as an image decomposition module.

Figure 2:
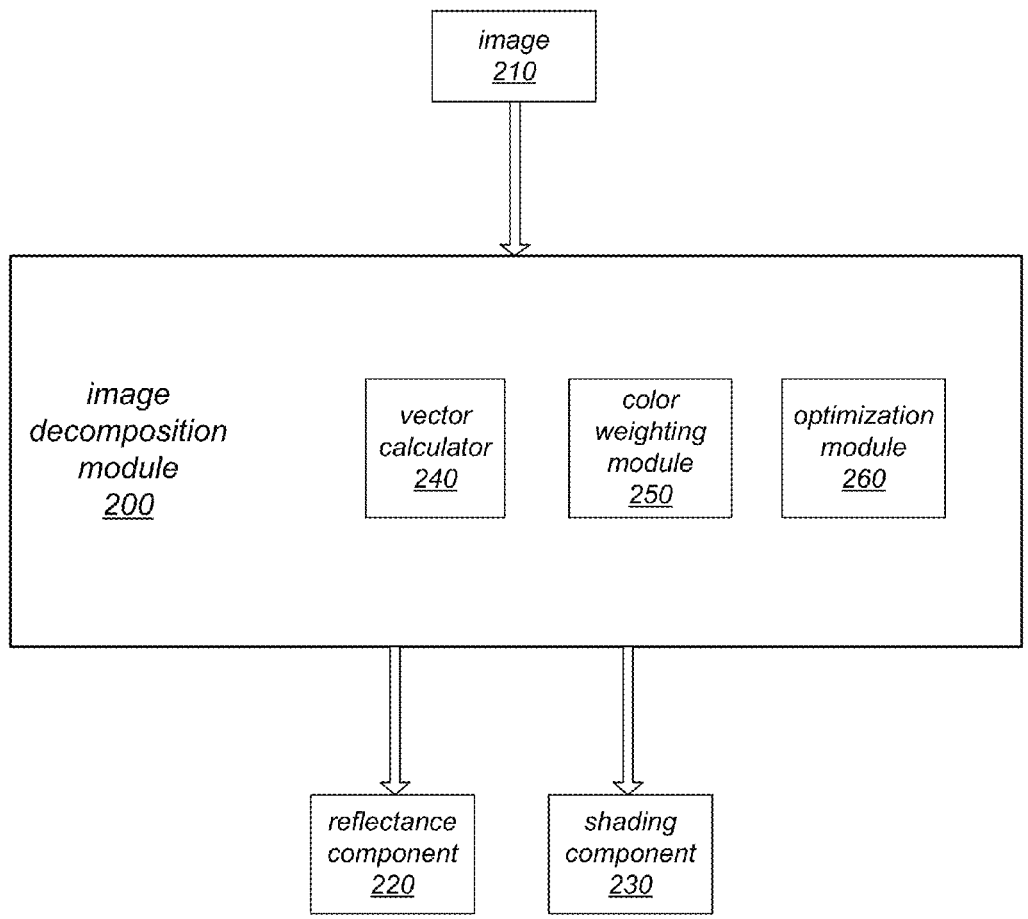
FIG. 2 illustrates an example embodiment of an image decomposition module which may be used to decompose an image into reflectance and shading components, according to some embodiments.

FIG. 2 illustrates an example embodiment of an image decomposition module that may implement an image decomposition method, as described herein. As illustrated in FIG. 2, image decomposition module 200 may receive as input an image 210, which may be a color digital image. The digital image may be, for example, an image captured by a digital camera, a photograph scanned into a computer system, a video frame extracted from a digital video sequence, or any other type of image represented by digital image data. Digital image file types may include, but are not limited to Joint Photographic Experts Group (JPEG) files, Graphics Interchange Format (GIF) files, Tagged Image File Format (TIFF) files, or Portable Network Graphics (PNG) files. As illustrated in FIG. 2, module 200 may provide as output the reflectance component 220 and shading component 230 of image 210. Reflectance component 220 and shading component 230 may be digital images which contain the intrinsic reflectance and shading properties, respectively, of image 210. Reflectance component 220 and shading component 230 may be used by a developer to create a 3D model of one or more objects depicted in image 210.

Image decomposition module 200 may include, as illustrated in FIG. 2, modules which may perform various functions to decompose image 210 into reflectance component 220 and shading component 230. As described in further detail below, vector calculator 240 of module 200 may transform image data of image 210 into an image gradient which may include a reflectance component gradient and a shading component gradient. Vector calculator 240 may also, based on a difference between the color channels of the image gradient, determine a vector that may be perpendicular to the direction of the reflectance component gradient. As described in further detail below, color weighting module 250 may weight the color channels of the image gradient based on the intensity of the color signals of the color channels. The weighting applied by color weighting module 250 may improve the accuracy of an estimation of the direction of the reflectance component of the image. As described in further detail below, optimization module 260 may optimize the calculation of the shading component gradient by applying a regularization term. The regularization term may improve the accuracy of the shading component gradient by diminishing the effects of low color signal intensity within some regions of the image.

In contrast to conventional methods which use a binary classification method to classify image derivatives (e.g., changes in image characteristics) as either a reflectance or shading derivative, image decomposition module 200 may use an image decomposition method which considers each position (e.g., each pixel) on an image to be a combination of both reflectance and shading characteristics. The image decomposition method employed by image decomposition module 200 may produce more accurate models of the reflectance and shading components of an image than conventional methods which use a strict binary classification of image derivatives. The accuracy of the image decomposition method may not be limited by the strict binary classification of image positions or the threshold parameter needed for such a binary classification. Rather, the image decomposition method may produce a more accurate result by extracting the reflectance and shading components from each position (e.g., pixel) of an image, as described in further detail below. In some embodiments, the execution time that may be required by image decomposition module 200 to extract the reflectance and shading components of an image may be similar to the execution time required by conventional binary classification methods (e.g. several seconds for an 800×600 image), and may be faster than the execution time required by conventional trained classifiers (e.g. several minutes for an 800×600 image). Accordingly, in some embodiments, image decomposition module 200 may extract a more accurate representation of the reflectance and shading components of an image than conventional methods and using approximately the same amount of time as the fastest conventional methods.

As described above, an image may include intrinsic reflectance and shading properties. Image decomposition module 200 may consider each position (e.g., pixel) on an image to be a combination of reflectance and shading properties. Accordingly, in some embodiments, an image may be represented as a product of the reflectance component and the shading component of the image. For example, an image i may be the product of a colored reflectance component r and a grayscale shading component s, as illustrated in equation (1a):

$$i(x,y,c)=r(x,y,c)s(x,y) \quad (1a)$$

where x, y denote the coordinates of a pixel position, and c denotes the color channel of the pixel. Color channel c may include red-green-blue (RGB) color channels of the pixel color. In other embodiments, other color spaces or different numbers of color channels may be included in the color channel of a pixel. A single color channel of an image may be represented by N values of $i(x,y,c)$, where N is the number of pixels within the image.

The product of equation (1a), $i(x,y,c)$, may be a known value for an existing image, as the value of each pixel of the image may be obtained from the image data. Accordingly, the reflectance component, $r(x,y,c)$, and shading component, $s(x,y)$, of an image may be determined by solving equation (1a) for the values of $r(x,y,c)$ and $s(x,y)$.

However, a unique solution for the reflectance and shading components may not be directly obtained from equation (1a)

because equation (1a) is a single equation with two unknown variables: (r(x,y,c) and s(x,y)). A unique solution may not be computed when the number of unknown variables contained in one or more equations exceeds the number of equations. Specifically, in the case of equation (1a), with one equation and two unknown variables, r and s, there are a number of different values of r and s that may result in the same value of i. Accordingly, equation (1a) as presented above is "ill-posed"; that is, equation (1a) not sufficient for calculating the actual values of reflectance component r and shading component s for an existing image.

As described above, a single color channel may be represented by N values of i(x,y,c), where N is the number of pixels within the image. Unfortunately, considering N pixels in an image and working to solve for N values of i(x,y,c) may not fix the ill-posed problem of equation (1a). In this case, there are N equations and 2N unknown variables, which is still an ill-posed problem.

As described above, color channel c may include multiple channels of the pixel color. For example, in some embodiments, color channel c may include RGB color channels of the pixel color. For a single pixel in an image, equation (1a) may be expanded to reflect the r, g, b color channels:

$$i(x,y,r) = r(x,y,r)s(x,y) \quad (1c)$$

$$i(x,y,g) = r(x,y,g)s(x,y) \quad (1d)$$

$$i(x,y,b) = r(x,y,b)s(x,y) \quad (1e)$$

Equations (1c-1e) also present an ill-posed problem: there are three equations and 4 unknown variables: r(x,y,r), r(x,y,g), r(x,y,b), s(x,y). All pixels of an image may be represented by 3N equations (1c-1e), with 4N unknown variables. In this case, the problem is still ill-posed and may not be solved for unique values of the unknown variables.

In some embodiments, equation (1a) may be simplified by temporarily eliminating at least one variable, which may enable the calculation of the reflectance and shading components of the image. As described in further detail below, equation (1a) may be simplified by applying an assumption that the gradient representations of the color channels of the reflectance component are parallel (e.g. the direction of each gradient is the same). Also described in further detail below, equation (1a) may be further simplified by optimizing the equation with a regularization term.

The optimization of equation (1a) may include converting the equation into linear space, for example converting the equation from multiplication to addition. As shown in equation (2), equation (1a) may be converted to addition by applying a logarithmic function to equation (1a):

$$\log(i(x,y,c)) = \log(r(x,y,c)) + \log(s(x,y)) \quad (2)$$

Equation (2) may be further simplified by substituting, I=log (i), R=log(r), and S=log(s):

$$I(x,y,c) = R(x,y,c) + S(x,y) \quad (3)$$

Figure 3:
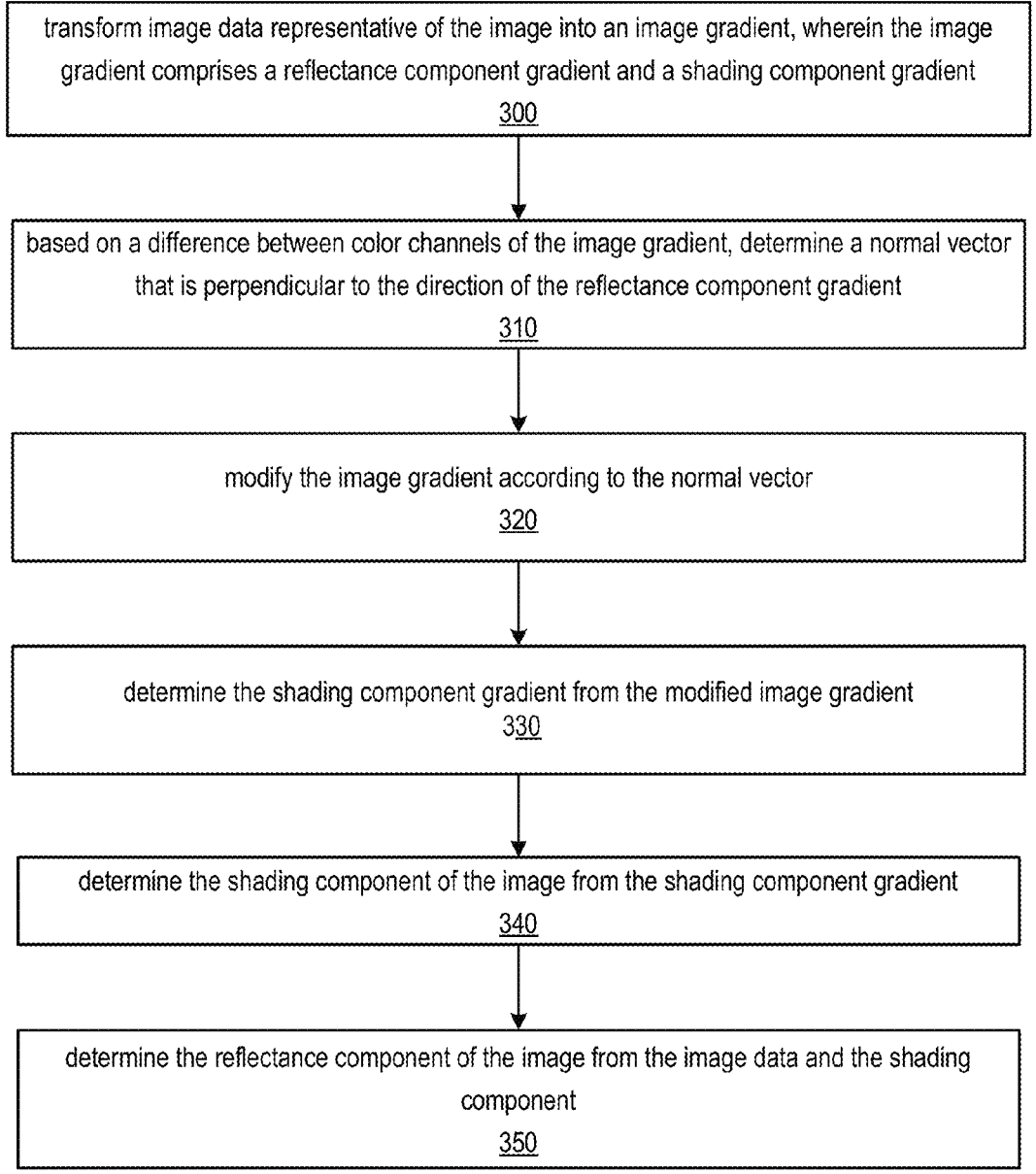
FIG. 3 is a flowchart of a general method for decomposing an image into reflectance and shading components, according to some embodiments.

Image decomposition module 200 may implement the method illustrated in FIG. 3 to decompose an image into reflectance and shading components. Vector calculator 240, as indicated at 300 of FIG. 3, may transform the image data into an image gradient (a gradient may be represented as $$\nabla = \left(\frac{\partial}{\partial x}, \frac{\partial}{\partial y}\right)\text{)},$$

which may include a reflectance component gradient and a shading component gradient:

$$\nabla I(x,y,c) = \nabla R(x,y,c) + \nabla S(x,y) \quad (4a)$$

Gradients may be directional vectors which indicate a rate of change at a particular point on a surface or within a vector field. The direction of a gradient may indicate the direction of the highest rate of change of an attribute across the surface or vector field from the particular point. The magnitude of a gradient may indicate the highest rate of change of the attribute at the particular point on the surface or within the vector field. The gradient domain may provide a convenient and intuitive environment for expressing the properties of an image in terms of variances that occur across the image. Accordingly, an image and the reflectance and shading components corresponding to the image may be represented in the gradient domain.

Figure 4:
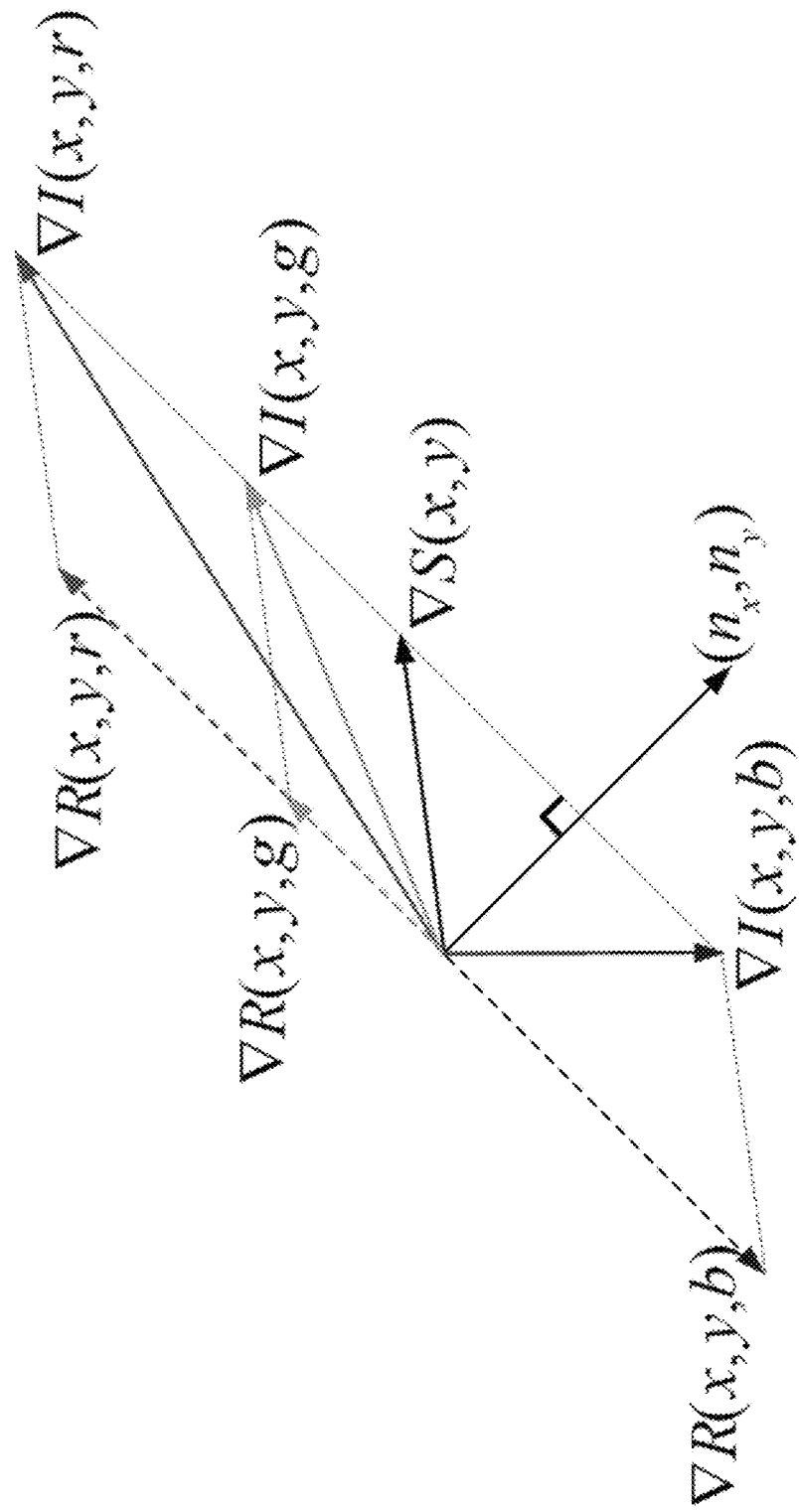
FIG. 4 illustrates the gradients of an image and the gradients of the reflectance and shading components of the image, according to some embodiments.

FIG. 4 illustrates the gradients of an image and the gradients of the reflectance and shading components of the image. As illustrated in FIG. 4, the color channels of the image gradient and the reflectance gradient are represented as r, g, b channel gradients. As illustrated in FIG. 4, a gradient may represent the direction and magnitude of change of an image characteristic at a pixel position (x,y) on an image. The image characteristic may be a characteristic of an object depicted in the image, for example, the color or texture of the surface of the object. For example, for reflectance gradient, ∇R(x,y,r), illustrated in FIG. 4: the direction of the gradient (e.g., the direction of the arrow) represents the direction of the highest rate of change of the red color channel from pixel position (x,y) across the surface of the object, and the length of the gradient (e.g., the length of the arrow) represents the magnitude of the highest rate of change of the red color channel at pixel position (x,y). FIG. 4 also illustrates the reflectance and shading component gradient sums for each of the color channel gradients of the image:

$$\nabla I(x,y,r) = \nabla R(x,y,r) + \nabla S(x,y) \quad (4b)$$

$$\nabla I(x,y,g) = \nabla R(x,y,g) + \nabla S(x,y) \quad (4c)$$

$$\nabla I(x,y,b) = \nabla R(x,y,b) + \nabla S(x,y) \quad (4d)$$

While equations (4b-4d) have been simplified and converted into a more intuitive environment for representing surface properties in an image (e.g., the gradient domain), the equations still present an unsolvable mathematical problem, with three equations and four unknown variables. These equations may be simplified by adding a constraint which may narrow the problem such that a unique solution may be determined. The constraint may be related to an assumption regarding the characteristics of the reflectance component color channel gradients. For example, observations of the material properties of typical surfaces demonstrate that changes in the color of the surface are most likely to occur in a similar manner for each of the RGB color channels. Since color changes across a surface may be assumed to occur in a similar manner for each of the RGB color channels, the gradients of each of the RGB color channels may point in the same (or, exact opposite) directions. Accordingly, gradients representing the RGB color channels of the reflectance component of an image may be assumed to be parallel. FIG. 4 illustrates the parallel color channel gradients of the reflectance component.

Furthermore, it may be observed that over the surface of a single material, the magnitude of the reflectance component color channel gradients may be approximately zero since there may likely be minimal material property changes across the surface of a same material. However, at a boundary between two different materials, the reflectance component color channel gradients may have large magnitudes which represent a significant amount of change in the material properties (e.g., the colors) between the two surfaces. Using these observations, it may be assumed that the reflectance component color channel gradients are perpendicular to the surface at a location on the surface which is a boundary between two different materials. Therefore, the reflectance component color channel gradients may also be assumed to be parallel at the boundary between two different surface materials. This assumption may still be applicable for a case in which one or more of the RGB color channel gradients are zero (e.g., there is no green color channel, and, therefore, no green gradient). A zero vector may be considered to be collinear with any vector. Therefore, a zero color channel gradient may still be considered parallel to the other color channel gradients and perpendicular to the surface at a boundary of a material change. Accordingly, the parallel gradient assumption for the color channels of the reflectance component of an image may be applicable for typical situations in which material properties change across the surface of an object.

The assumption that all reflectance component color channel gradients are parallel may lead to a further assumption that the gradient of the total reflectance component is parallel to the reflectance component color channel gradients. More specifically, the direction of the reflectance component gradient may be assumed to be the same as the direction of the reflectance component color channel gradients. Using this assumption, vector calculator 240 may estimate the direction of the reflectance component gradient based on a difference between the gradients of the image color channels. A illustrated in 310 of FIG. 3, vector calculator 240 may determine, based on a difference between the color channels of the image gradient, a normal vector that may be perpendicular to the direction of the reflectance component gradient.

Figure 5:
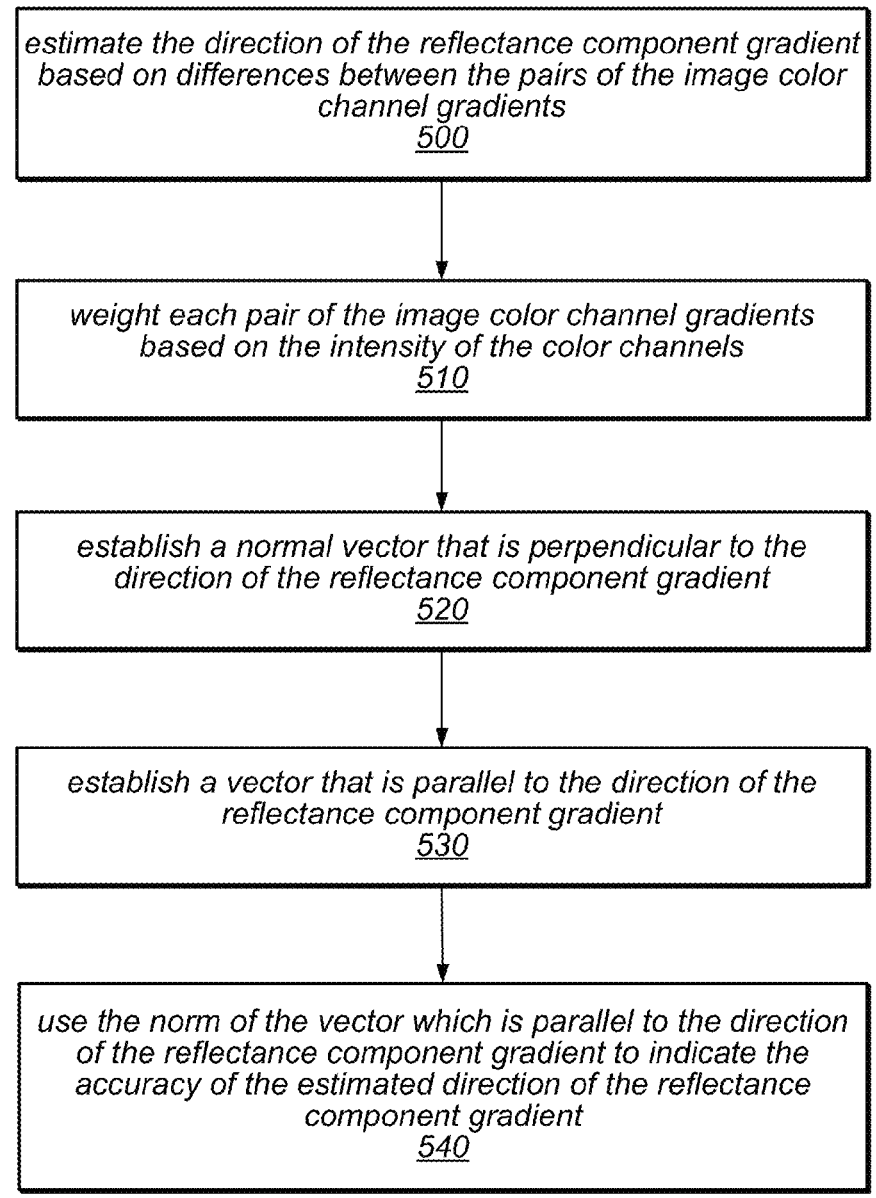
FIG. 5 is a flowchart of a general method for determining a normal vector that is perpendicular to the direction of a reflectance component gradient, based on a difference between color channels of an image gradient, according to some embodiments.

FIG. 5 illustrates a method that may be implemented by vector calculator 240 to estimate the direction of the reflectance component gradient and determine a normal vector that is perpendicular to the reflectance component gradient, based on a difference between the color channels of the image gradient. As indicated at 500 of FIG. 5, the direction of the reflectance component gradient may be estimated based on differences between the pairs of the image color channel gradients. For example, equation 4(c) may be subtracted from equation 4(b):

$$\nabla I(x,y,r)-\nabla I(x,y,g)=\nabla R(x,y,r)+\nabla S(x,y)-\nabla R(x,y,g)-\nabla S(x,y) \quad (5)$$

The shading gradients are cancelled out in equation (5), resulting in equation (6):

$$\nabla I(x,y,r)-\nabla I(x,y,g)=\nabla R(x,y,r)-\nabla R(x,y,g) \quad (6)$$

Since all of the reflectance component color channel gradients, $\nabla R(x,y,r)$, $\nabla R(x,y,g)$, and $\nabla R(x,y,b)$, are parallel to each other and parallel to $\nabla R(x,y,c)$, a difference calculated between two of the reflectance component color channel gradients may also be parallel to $\nabla R(x,y,c)$. Accordingly, $\nabla R(x,y,r)-\nabla R(x,y,g)$ may be parallel to $\nabla R(x,y,c)$. Since $\nabla I(x,y,r)-\nabla I(x,y,g)$ is equivalent to $\nabla R(x,y,r)-\nabla R(x,y,g)$ (from equation (6)), $\nabla I(x,y,r)-\nabla I(x,y,g)$ may also be parallel to $\nabla R(x,y,c)$. Accordingly, $\nabla I(x,y,r)-\nabla I(x,y,g)$ may represent the direction of the reflectance component, $\nabla R(x,y,c)$.

The vector represented by $\nabla I(x,y,r)-\nabla I(x,y,g)$ may indicate the direction of the reflectance component gradient. However, at some pixel locations on an image, this vector may vanish due to the absence of red and/or green color channels at the pixel location. At such pixel locations, the direction of $\nabla R(x,y,c)$ may not be accurately represented. More specifically, equation (6) may not accurately represent the direction of $\nabla R(x,y,c)$ when either the $\nabla I(x,y,r)$ or $\nabla I(x,y,g)$ color channel gradients, or both, are reduced to zero and, therefore, not present in the equation.

To decrease the impact of color channel absences at certain pixel locations in an image, the direction of $\nabla R(x,y,c)$ may be based on differences between the pairs of the image color channel gradients. For example, in a similar manner as described above, Equation 4(d) may be subtracted from equation 4(c):

$$\nabla I(x,y,g)-\nabla I(x,y,b)=\nabla R(x,y,g)+\nabla S(x,y)-\nabla R(x,y,b)-\nabla S(x,y) \quad (7)$$

The shading gradients are cancelled out in equation (7), resulting in equation (8):

$$\nabla I(x,y,g)-\nabla I(x,y,b)=\nabla R(x,y,g)-\nabla R(x,y,b) \quad (8)$$

Similarly, equation 4(b) may be subtracted from equation 4(d):

$$\nabla I(x,y,b)-\nabla I(x,y,r)=\nabla R(x,y,b)+\nabla S(x,y)-\nabla R(x,y,r)-\nabla S(x,y) \quad (9)$$

The shading gradients are cancelled out in equation (9), resulting in equation (10):

$$\nabla I(x,y,b)-\nabla I(x,y,r)=\nabla R(x,y,b)-\nabla R(x,y,r) \quad (10)$$

A weighted sum of equations (6), (8) and (10) may be used to represent the direction of the reflectance gradient, as shown in equation (11):

$$(\nabla I(x,y,r)-\nabla I(x,y,g))\pm(\nabla I(x,y,g)-\nabla I(x,y,b))\pm \\ (\nabla I(x,y,b)-\nabla I(x,y,r))=(\nabla R(x,y,r)-\nabla R(x,y,g))+ \\ (\nabla R(x,y,g)-\nabla R(x,y,b))+(\nabla R(x,y,b)-\nabla R(x,y,r)) \quad (11)$$

The right side of equation (11) (e.g. the reflectance gradients) may be represented simply as $\nabla R(x,y,c)$ since it has been established, as described above, that the difference between reflectance component color channel gradients is the same as the direction of $\nabla R(x,y,c)$. Accordingly, the direction of $\nabla R(x,y,c)$ may be represented by a weighted sum of the differences of all paired combinations of the image gradient color channels as follows. $\nabla R(x,y,c)$ is parallel to the weighted sum of the differences of all paired combinations of the image gradient color channels, as shown in equation (12).

$$\nabla R(x,y,c) \square (\nabla I(x,y,r)-\nabla I(x,y,g))\pm(\nabla I(x,y,g)- \\ \nabla I(x,y,b))\pm(\nabla I(x,y,b)-\nabla I(x,y,r)) \quad (12)$$

When summing the directions of three gradients, as in equation (12), the total direction should be enhanced by the direction of each individual gradient, rather than diminished by gradients which have opposing directions. To prevent the directions of gradient pairs from cancelling each other out in equation (12), the differences of the paired combinations of the image gradient color channels may be added or subtracted dependent on the respective angles between the directions of the gradients. For example, if the angle between $(\nabla I(x,y,r)-\nabla I(x,y,g))$ and $(\nabla I(x,y,g)-\nabla I(x,y,b))$ is less than or equal to 90 degrees, the differences may be added in equation (12). If the angle between $(\nabla I(x,y,r)-\nabla I(x,y,g))$ and $(\nabla I(x,y,g)-\nabla I(x,y,b))$ is greater than 90 degrees, the differences may be subtracted in equation (12). The same rules may be applied to determine whether $(\nabla I(x,y,b)-\nabla I(x,y,r))$ may be added or subtracted in equation (12). For an example in which the angle between $(\nabla I(x,y,r)-\nabla I(x,y,g))$ and $(\nabla I(x,y,g)-\nabla I(x,y,b))$ is less than 90 degrees and the angle between $(\nabla I(x,y,r)-$ ∇I(x,y,g)) and (∇I(x,y,b)−∇I(x,y,r)) is greater than 90 degrees, equation (12) becomes equation (12a):

$$\nabla R(x,y,c) \square (\nabla I(x,y,r) - \nabla I(x,y,g)) + (\nabla I(x,y,g) - \nabla I(x,y,b)) - (\nabla I(x,y,b) - \nabla I(x,y,r)) \quad (12a)$$

As indicated at 510 of FIG. 5, color weighting module 250 may weight each pair of the image color channel gradients based on the intensity of the color channels The weighting applied by weighting module 250 may generate a more accurate representation of the direction of ∇R(x,y,c). Color channels with high color intensity may be given more weighting than color channels with low color intensity to reduce the effects of noise which may be present in an image. A color channel with high color intensity is likely to have a high signal-to-noise ratio (SNR). The SNR of a color channel may represent the ratio of the level of signal (e.g., color) present in the color channel to the level of noise present in the color channel. Color channels with a high SNR may include significantly more color than noise, and, as a result, may be less likely to be distorted by noise that is present in the channel. In contrast, color channels with a low SNR may have more noise than color and may be more likely to be distorted by the noise. Accordingly, color channels with high intensity may provide a more accurate representation of the true color of an image and may be more heavily weighted than color channels with low intensity in computations involving a combination of all color channels.

Embodiments of vector calculator 240 may group the RGB color channels of the reflectance component into pairs and determine weighting factors for each pair according to two criteria related to the intensity of the color channels: 1) the intensity of each color channel in the source image and 2) the magnitude of the difference (e.g., gradient vector difference) between the intensity levels of the two color channels in the pair.

The intensity of a pair of color channels (r and g channels, for example) in a source image may be expressed as:

$$\frac{1}{i(x,y,r)} + \frac{1}{i(x,y,g)} \quad (13)$$

Equation (13) may be optimized as follows:

$$\left(\frac{1}{i(x,y,r)}\right)\left(\frac{i(x,y,g)}{i(x,y,g)}\right) + \left(\frac{1}{i(x,y,g)}\right)\left(\frac{i(x,y,r)}{i(x,y,r)}\right) \quad (14)$$

which is equivalent to:

$$\frac{i(x,y,g) + i(x,y,r)}{i(x,y,r)i(x,y,g)} \quad (15)$$

Equation (15) may be inverted to create a weighting factor $w_{rg}'$ which is based on the intensity levels of the r and g color channels:

$$w_{rg}' = \frac{i(x,y,r)i(x,y,g)}{i(x,y,g) + i(x,y,r)} \quad (16a)$$

Weighting factors based on the intensity levels of the g and b color channel pair and the b and r color channel pair may be created in a similar manner, resulting in the following intensity weighting factors, $w_{gb}'$ and $w_{br}'$:

$$w_{gb}' = \frac{i(x,y,g)i(x,y,b)}{i(x,y,b) + i(x,y,g)} \quad (16b)$$

$$w_{br}' = \frac{i(x,y,b)i(x,y,r)}{i(x,y,r) + i(x,y,b)} \quad (16c)$$

A second weighting factor, which may represent the magnitude of the difference between the intensity levels of the two color channels in the pair may be combined with equations (16a-16c) to establish a complete weighting factor for each pair of color channels:

$$w_{rg} = \frac{i(x,y,r)i(x,y,g)}{i(x,y,r) + i(x,y,g)} \|\nabla I(x,y,r) - \nabla I(x,y,g)\| \quad (17a)$$

$$w_{gb} = +\left(\frac{i(x,y,g)i(x,y,b)}{i(x,y,g) + i(x,y,b)}\right)\|\nabla I(x,y,g) - \nabla I(x,y,b)\| \quad (17b)$$

or $$w_{gb} = -\left(\frac{i(x,y,g)i(x,y,b)}{i(x,y,g) + i(x,y,b)}\right)\|\nabla I(x,y,g) - \nabla I(x,y,b))\| \quad (17c)$$

$$w_{br} = +\left(\frac{i(x,y,b)i(x,y,r)}{i(x,y,b) + i(x,y,r)}\right)\|\nabla I(x,y,b) - \nabla I(x,y,r))\| \quad (17d)$$

or $$w_{br} = -\left(\frac{i(x,y,b)i(x,y,r)}{i(x,y,b) + i(x,y,r)}\right)\|\nabla I(x,y,b) - \nabla I(x,y,r))\| \quad (17e)$$

As described above, in reference to equation (12), when summing the directions of three gradients, the total direction should be enhanced by the direction of each individual gradient, rather than diminished by gradients which have opposing directions. To prevent the directions of gradient pairs from cancelling each other out, the sign (e.g., positive or negative) of $w_{gb}$ and $w_{br}$ may be determined dependent on the respective angles between the directions of the gradients. The value of $w_{gb}$ may be equivalent to equation (17b) if the angle between (∇I(x,y,r)−∇I(x,y,g)) and (∇I(x,y,g)−∇I(x,y,b)) is less than or equal to 90 degrees. The value of $w_{gb}$ may be equivalent to equation (17c) if the angle between (∇I(x,y,r)−∇I(x,y,g)) and (∇I(x,y,g)−∇I(x,y,b)) is greater than 90 degrees. Similarly, the value of $w_{br}$ may be equivalent to equation (17d) if the angle between (∇I(x,y,r)−∇I(x,y,g)) and (∇I(x,y,b)−∇I(x,y,r)) is less than or equal to 90 degrees. The value of $w_{br}$ may be equivalent to equation (17e) if the angle between (∇I(x,y,r)−∇I(x,y,g)) and (∇I(x,y,b)−∇I(x,y,r)) is greater than 90 degrees.

Combining the weighting factors of equations (17a, 17b or 17c, and 17d or 17e) with equation (12), the direction of the reflectance component, weighted according to the intensity levels of the color channels, may be represented as:

$$\nabla R(x,y,c) = w_{rg}(\nabla I(x,y,r) - \nabla I(x,y,g)) + w_{gb}(\nabla I(x,y,g) - \nabla I(x,y,b)) + w_{br}(\nabla I(x,y,b) - \nabla I(x,y,r)) \quad (18)$$

As indicated at 520 of FIG. 5, a normal vector that is perpendicular to the direction of the reflectance component gradient, ∇R(x,y,c) may be established. Such a vector may be represented by $\vec{n} = (n_x, n_y)$. Vector $\vec{n} = (n_x, n_y)$ is illustrated in FIG. 3 as a vector perpendicular to ∇R(x,y,c). As indicated at 530 of FIG. 5, a vector that is parallel to the direction of the reflectance component gradient, ∇R(x,y,c) may be established. Since vector $\vec{n} = (n_x, n_y)$ is perpendicular to ∇R(x,y,c), as established above, a vector that is perpendicular to $\vec{n}=(n_x, n_y)$ will be parallel to $\nabla R(x,y,c)$. The vector parallel to $\nabla R(x,y,c)$, may be represented by rotating either the x or y component of $\vec{n}=(n_x,n_y)$ by 90 degrees. For example, if the x component of $\vec{n}=(n_x,n_y)$ is rotated by 90 degrees, the direction of a vector perpendicular to $\vec{n}=(n_x,n_y)$ and parallel to $\nabla R(x,y,c)$ may be represented as $(n_y,-n_x)$. Since the direction of $(n_y,-n_x)$ is parallel to the direction of $\nabla R(x,y,c)$, $(n_y,-n_x)$ may be substituted for $\nabla R(x,y,c)$ in equation (18):

$$\begin{bmatrix} n_y \\ -n_x \end{bmatrix} = w_{rg}(\nabla I(x,y,r) - \nabla I(x,y,g)) + \quad (19)$$
$$w_{gb}(\nabla I(x,y,g) - \nabla I(x,y,b)) + w_{br}(\nabla I(x,y,b) - \nabla I(x,y,r))$$

As described above, the direction of $(n_y,-n_x)$ is parallel to $\nabla R(x,y,c)$. As indicated at 540 of FIG. 5, the norm of $(n_y,-n_x)$, $\sqrt{n_x^2+n_y^2}$, may indicate the accuracy of the estimated direction of $\nabla R(x,y,c)$. As calculated above, the direction of $\nabla R(x,y,c)$ is an estimate based on the assumption that the color channel gradients of the reflectance component are parallel. The calculated direction of $\nabla R(x,y,c)$ has been weighted to diminish the influence of areas of low color intensity in the image, as described above. However, the direction of $\nabla R(x,y,c)$ may still be slightly inaccurate for some locations of the image. The weighting method described above may diminish, but may not completely remove, the influence of low color intensity in some areas of the image. The norm of $(n_y,-n_x)$, $\sqrt{n_x^2+n_y^2}$, may indicate areas of low color intensity within an image and, therefore, may be used to indicate the confidence level, or accuracy of the direction $\nabla R(x,y,c)$ at a pixel position $(x,y)$ on an image.

The value of $\sqrt{n_x^2+n_y^2}$ may indicate the color intensity at a pixel position $(x,y)$ and may be directly proportional to the confidence level of the calculated direction of $\nabla R(x,y,c)$ at the pixel position. Similarly as described above, a low value of $\sqrt{n_x^2+n_y^2}$ may indicate a color intensity with a low SNR. A low SNR may indicate that the color signal at the pixel position $(x,y)$ is likely to be distorted by noise that is present in the color signal. Accordingly, the confidence value for a pixel position with a low value of $\sqrt{n_x^2+n_y^2}$ may be low, indicating that the estimated direction of $\nabla R(x,y,c)$ at the pixel position is likely to be inaccurate. A high value of $\sqrt{n_x^2+n_y^2}$ may indicate a color intensity with a high SNR. A high SNR may indicate that the color signal at the pixel position $(x,y)$ is unlikely to be distorted by noise that is present in the color signal. Accordingly, the confidence value for a pixel position with a high value of $\sqrt{n_x^2+n_y^2}$ may be high, indicating that the estimated direction of $\nabla R(x,y,c)$ at the pixel position is likely to be accurate.

Returning to FIG. 3, as indicated at 320, image decomposition module 200 may modify the image gradient according to vector $\vec{n}=(n_x,n_y)$. For example, projecting equation (4a) in the direction of vector $\vec{n}=(n_x,n_y)$ by applying the dot product of $\vec{n}=(n_x,n_y)$ to equation (4a) yields:

$$\vec{n} \cdot \nabla I(x,y,c) = \vec{n} \cdot \nabla R(x,y,c) + \vec{n} \cdot \nabla S(x,y) \quad (20)$$

The dot product of two vectors which are perpendicular to one another is zero. As described above, $\vec{n}$ is perpendicular to $\nabla R(x,y,c)$. Accordingly:

$$\vec{n} \cdot \nabla R(x,y,c) = 0 \quad (21)$$

With $\vec{n} \cdot \nabla R(x,y,c) = 0$, equation (20) becomes:

$$\vec{n} \cdot \nabla S(x,y) - \vec{n} \cdot \nabla I(x,y,c) = 0 \quad (22)$$

The method illustrated in FIG. 3, as indicated at 330, may include determining the shading component gradient from the modified image gradient. For example, image decomposition module 200 may solve equation (22) for the shading component, since $\vec{n} \cdot \nabla I(x,y,c)$ is a known value. The image gradient of equation (22) may be expressed as a weighted sum of RGB color channels to provide a more accurate representation of $\nabla S(x,y)$. Applying a color channel weighting, $i(x,y,c)$, to $\nabla I(x,y,c)$ of equation (22) yields:

$$\vec{n} \cdot \nabla S(x,y) - \vec{n} \cdot \frac{i(x,y,c)\nabla I(x,y,c)}{i(x,y,c)} = 0 \quad (23)$$

Representing the RGB color channels as a sum of color channels results in equation (24):

$$\vec{n} \cdot \nabla S(x,y) - \vec{n} \cdot \frac{\sum_c i(x,y,c)\nabla I(x,y,c)}{\sum_c i(x,y,c)} = 0 \quad (24)$$

where c=r, g, b color channels.
$\nabla S(x,y)$ may be replaced with $(u,v)$ as follows:

$$\vec{n} \cdot \nabla S(x,y) = \vec{n} \cdot (u,v) \quad (25)$$

Substituting $(n_x, n_y)$ for $\vec{n}$, yields:

$$\vec{n} \cdot \nabla S(x,y) = (n_x,n_y) \cdot (u,v) \quad (26)$$

The dot product of two vectors $a=[a_1, a_2, \ldots, a_n]$ and $b=[b_1, b_2, b_n]$ may be represented as $$a \bullet b = \sum_{i=1}^{n} a_i b_i = a_1 b_1 + a_2 b_2 + \ldots + a_n b_n \quad (27)$$

Accordingly, the dot product of $(n_x,n_y) \cdot (u,v)$ may be represented as:

$$(n_x,n_y) \cdot (u,v) = n_x u + n_y v \quad (28)$$

Substituting equation (28) into equation (26) yields:

$$\vec{n} \cdot \nabla S(x,y) = n_x u + n_y v \quad (29)$$

The second term of equation (24) may be simply represented as variable p:

$$p = -\vec{n} \cdot \frac{\sum_c i(x,y,c)\nabla I(x,y,c)}{\sum_c i(x,y,c)} \quad (30)$$

Substituting equations (29) and (30) into equation (24) results in a simplified representation of (24):

$$n_x u + n_y v + p = 0 \quad (31)$$

As described above, some regions of an image may have one or more color channels with low intensity, due to an absence of color or low color intensity in the one or more color channels. Within these regions, the low color intensity may cause one or more terms of equation (31) to trend toward zero and, potentially, vanish from equation (31). Such degenerate cases may result in an inaccurate representation of equation (31) or may prevent the solution of equation (31). For example, degeneracy in equation (31) may result from vanishing values of normal vector $\vec{n}$ and/or variable p in image regions with low color intensity.

In some embodiments, optimization module 260 may optimize equation (31) to reduce the influence of degenerate cases with vanishing values of normal vector $\vec{n}$ and/or variable p in image regions with low color intensity. For example, equation (31) may be optimized by adding a regularization term which may place an additional constraint on equation (31) to reduce the impact of low intensity regions in an image. For example, equation (31) may be transformed by adding a regularization term as shown in equation (32):

$$E=\iint((n_x u+n_y v+p)^2+\lambda(\|\nabla u\|^2+\|\nabla v\|^2))dxdy \quad (32)$$

The regularizing term $\|\nabla u\|^2+\|\nabla v\|^2$ with Langrangian multiplier $\lambda$, may place a smoothness constraint on vector field (u,v). More specifically, $\lambda$ may dictate the smoothness of shading components $n_x u$ and $n_y v$. In various embodiments, $\lambda$ may be chosen to be any arbitrary, small, positive number, depending on the desired degree of smoothness. In some embodiments, image decomposition module 200 may use an iterative method, such as the Gauss-Seidel method, to solve for (u(x,y),v(x,y)) so that the total error E is minimized. In other embodiments, other algorithms may be used to solve for (u(x,y),v(x,y)). Note that (u(x,y),v(x,y)) is equivalent to $\nabla S(x,y)$, as shown in equation (33):

$$(u(x,y),v(x,y))=(u,v)=\nabla S(x,y) \quad (33)$$

As indicated at 340, the method illustrated in FIG. 3 may include determining the shading component, S(x,y), of the image from the shading component gradient, $\nabla S(x,y)$. For example, image decomposition module 200 may use Poisson's equation to convert the shading component gradient $\nabla S(x,y)$ into the shading component, S(x,y), of the image. Poisson's equation is shown in equation (34):

$$\nabla^2 S=u_x+v_y \quad (34)$$

As shown above, S(x,y)=log(s(x,y)), in equations (2) and (3). The equation S(x,y)=log(s(x,y)) may be converted to equation (35):

$$s(x,y)=e^{S(x,y)} \quad (35)$$

S(x,y) may be a known quantity, from the solution of Poisson's equation (34) above, and may be substituted in equation (35) to solve for the value of s(x,y). Accordingly, s(x,y), the shading component of the image at pixel location x,y may be determined.

As indicated at 350, the method illustrated in FIG. 3 may include determining the reflectance component of the image, r(x,y,c), from the image data and the shading component. For example, image decomposition module 200 may use the known image data and shading component to solve for the reflectance component.

From equation (3) above:

$$R(x,y,c)=I(x,y,c)-S(x,y) \quad (36)$$

Also, as shown above, R=log(r). Substituting R=log(r) into equation (36) yields:

$$\log(r)(x,y,c)=I(x,y,c)-S(x,y) \quad (37)$$

Equation (38) may be converted to equation (38):

$$r(x,y,c)=e^{I(x,y,c)-S(x,y)} \quad (38)$$

S(x,y), from the solution of Poisson's equation (34) above and the known value of I(x,y,c) may be substituted into equation (38) to solve for the value of r(x,y,c), the reflectance component of the image at pixel location x,y.

As described above, equations have been derived for both the shading and reflectance components of an image. These equations may be solved for each (x,y) position of the N pixels of the image to obtain the reflectance and shading components of the image at each (x,y) position on the image.

Example System

Figure 6:
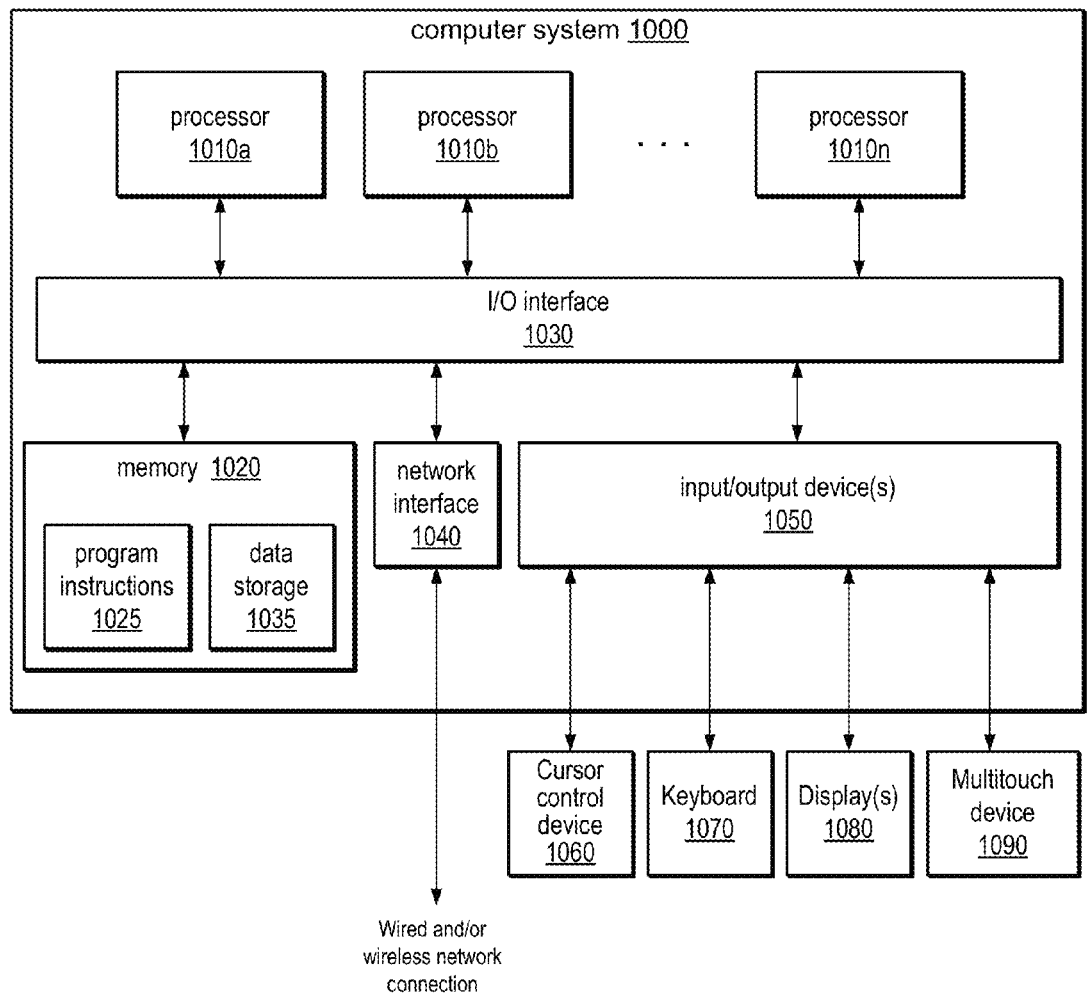
FIG. 6 illustrates an example computer system that may be used in some embodiments.

Various components of embodiments of methods as illustrated and described in the accompanying description may be executed on one or more computer systems, which may interact with various other devices. One such computer system is illustrated by FIG. 6. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, multitouch device 1090, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods as illustrated and described in the accompanying description may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those for methods as illustrated and described in the accompanying description, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 6, memory 1020 may include program instructions 1025, configured to implement embodiments of methods as illustrated and described in the accompanying description, and data storage 1035, comprising various data accessible by program instructions 1025. In one embodiment, program instruction 1025 may include software elements of methods as illustrated and described in the accompanying description. Data storage 1035 may include data that may be used in embodiments. In other embodiments, other or different software elements and/or data may be included.

Those skilled in the art will appreciate that computer system 1000 is merely illustrative and is not intended to limit the scope of methods as illustrated and described in the accompanying description. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. The order of method may be changed, and various elements may be added, reordered, combined, omitted, modified, etc. Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method for determining a reflectance component and a shading component of an image, comprising:
   transforming image data representative of the image into an image gradient, wherein the image gradient comprises a reflectance component gradient and a shading component gradient;
   based on a difference between color channels of the image gradient, determining a normal vector that is perpendicular to the direction of the reflectance component gradient;
   modifying the image gradient according to the normal vector;
   determining the shading component gradient from the modified image gradient;
   determining the shading component of the image from the shading component gradient; and
   determining the reflectance component of the image from the image data and the shading component.

2. The method of claim 1, wherein determining a normal vector that is perpendicular to the direction of the reflectance component gradient comprises:
   equating the direction of the reflectance component gradient to the difference between color channels of the image gradient based on a parallel property of the color channels of the reflectance component gradient;
   applying a weighting factor to the difference between color channels of the image gradient, wherein the weighting factor is dependent on the color signal intensity of each of the color channels of the image gradient.

3. The method of claim 2, wherein the difference between color channels of the image gradient is a sum of the differences between each pair of the color channels of the image gradient.

4. The method of claim 1, further comprising:
   determining a parallel vector that is parallel to the direction of the reflectance component gradient, wherein the norm of the parallel vector indicates the accuracy of the direction of the reflectance component gradient, wherein the norm of the parallel vector is the square root of the sum of the squares of a plurality of elements of the parallel vector.

5. The method of claim 1, wherein said determining the shading component gradient from the modified image gradient comprises:
   applying a weighting factor to the modified image gradient, wherein the weighting factor is dependent on the color signal intensity of each of the color channels of the image gradient;
   optimizing the determination of the shading component gradient by applying a regularization term to the modified image gradient, wherein the regularization term reduces the impact of low color signal intensity on the accuracy of the determined shading component gradient.

6. The method of claim 1, wherein said determining the shading component gradient from the modified image gradient comprises using the Gauss-Seidel method to calculate the shading component gradient.

7. The method of claim 1, wherein said determining the shading component of the image from the shading component gradient comprises using Poisson's equation to calculate the shading component of the image.

8. A non-transitory computer-readable storage medium storing program instructions executable on a computer to implement an image decomposition module configured to:
   transform image data representative of the image into an image gradient, wherein the image gradient comprises a reflectance component gradient and a shading component gradient;
   based on a difference between color channels of the image gradient, determine a normal vector that is perpendicular to the direction of the reflectance component gradient;
   modify the image gradient according to the normal vector;
   determine the shading component gradient from the modified image gradient;
   determine the shading component of the image from the shading component gradient; and
   determine the reflectance component of the image from the image data and the shading component.

9. The non-transitory computer-readable storage medium of claim 8, wherein said determining a normal vector that is perpendicular to the direction of the reflectance component gradient comprises:
   equating the direction of the reflectance component gradient to the difference between color channels of the image gradient based on a parallel property of the color channels of the reflectance component gradient;
   applying a weighting factor to the difference between color channels of the image gradient, wherein the weighting factor is dependent on the color signal intensity of each of the color channels of the image gradient.

10. The non-transitory computer-readable storage medium of claim 9, wherein the difference between color channels of the image gradient is a sum of the differences between each pair of the color channels of the image gradient.

11. The non-transitory computer-readable storage medium of claim 8, wherein the image decomposition module is further configured to:
   determine a parallel vector that is parallel to the direction of the reflectance component gradient, wherein the norm of the parallel vector indicates the accuracy of the direction of the reflectance component gradient, wherein the norm of the parallel vector is the square root of the sum of the squares of a plurality of elements of the parallel vector.

12. The non-transitory computer-readable storage medium of claim 8, said determining the shading component gradient from the modified image gradient comprises:
   applying a weighting factor to the modified image gradient, wherein the weighting factor is dependent on the color signal intensity of each of the color channels of the image gradient;
   optimizing the determination of the shading component gradient by applying a regularization term to the modified image gradient, wherein the regularization term reduces the impact of low color signal intensity on the accuracy of the determined shading component gradient.

13. The non-transitory computer-readable storage medium of claim 8, wherein said determining the shading component gradient from the modified image gradient comprises using the Gauss-Seidel method to calculate the shading component gradient.

14. The non-transitory computer-readable storage medium of claim 8, wherein said determining the shading component of the image from the shading component gradient comprises using Poisson's equation to calculate the shading component of the image.

15. A system, comprising:
a memory; and
one or more processors coupled to the memory, wherein the memory comprises program instructions executable by the one or more processors to implement a image decomposition module configured to:
transform image data representative of the image into an image gradient, wherein the image gradient comprises a reflectance component gradient and a shading component gradient;
based on a difference between color channels of the image gradient, determine a normal vector that is perpendicular to the direction of the reflectance component gradient;
modify the image gradient according to the normal vector;
determine the shading component gradient from the modified image gradient;
determine the shading component of the image from the shading component gradient; and
determine the reflectance component of the image from the image data and the shading component.

16. The system of claim 15, wherein said determining a normal vector that is perpendicular to the direction of the reflectance component gradient comprises:
equating the direction of the reflectance component gradient to the difference between color channels of the image gradient based on a parallel property of the color channels of the reflectance component gradient;
applying a weighting factor to the difference between color channels of the image gradient, wherein the weighting factor is dependent on the color signal intensity of each of the color channels of the image gradient.

17. The system of claim 16, wherein the difference between color channels of the image gradient is a sum of the differences between each pair of the color channels of the image gradient.

18. The system of claim 15, wherein the image decomposition module is further configured to:
determine a parallel vector that is parallel to the direction of the reflectance component gradient, wherein the norm of the parallel vector indicates the accuracy of the direction of the reflectance component gradient, wherein the norm of the parallel vector is the square root of the sum of the squares of a plurality of elements of the parallel vector.

19. The system of claim 15, wherein said determining the shading component gradient from the modified image gradient comprises:
applying a weighting factor to the modified image gradient, wherein the weighting factor is dependent on the color signal intensity of each of the color channels of the image gradient;
optimizing the determination of the shading component gradient by applying a regularization term to the modified image gradient, wherein the regularization term reduces the impact of low color signal intensity on the accuracy of the determined shading component gradient.

20. The system of claim 15, wherein said determining the shading component gradient from the modified image gradient comprises using the Gauss-Seidel method to calculate the shading component gradient.

* * * * *